United States Patent
Knight et al.

(10) Patent No.: US 9,591,451 B1
(45) Date of Patent: Mar. 7, 2017

(54) DYNAMIC GENERATION OF CUSTOMIZED CONTENT FOR DISPLAY ON A NETWORK DEVICE

(71) Applicant: Blue Bite LLC, New York, NY (US)

(72) Inventors: Paul Knight, Jamison, PA (US); Artem Korpachev, Brooklyn, NY (US); Thomas R. Duncan, Jr., Valley Stream, NY (US); Mikhail Damiani, New York, NY (US)

(73) Assignee: Blue Bite LLC, New York, NY (US)

( * ) Notice: Subject to any disclaimer, the term of this patent is extended or adjusted under 35 U.S.C. 154(b) by 0 days.

(21) Appl. No.: 15/335,314

(22) Filed: Oct. 26, 2016

(51) Int. Cl.
| | |
|---|---|
| *H04W 24/00* | (2009.01) |
| *H04W 4/02* | (2009.01) |
| *H04L 29/08* | (2006.01) |
| *H04M 1/725* | (2006.01) |

(52) U.S. Cl.
CPC ............ *H04W 4/023* (2013.01); *H04L 67/02* (2013.01); *H04L 67/18* (2013.01); *H04L 67/36* (2013.01); *H04M 1/72572* (2013.01)

(58) Field of Classification Search
CPC ........ H04W 4/023; H04L 67/02; H04L 67/18; H04L 67/36; H04M 1/72572
USPC ............................................ 455/456.1–457
See application file for complete search history.

(56) References Cited

U.S. PATENT DOCUMENTS

| | | |
|---|---|---|
| 8,781,502 B1 | 7/2014 | Middleton et al. |
| 2015/0106395 A1 | 4/2015 | Stafira et al. |
| 2016/0044442 A1 | 2/2016 | Pacelli et al. |
| 2016/0086228 A1 | 3/2016 | Babb et al. |
| 2016/0092966 A1 | 3/2016 | Vigier et al. |
| 2016/0117458 A1 | 4/2016 | Hermans et al. |
| 2016/0148270 A1 | 5/2016 | Vigier et al. |
| 2016/0227359 A1 | 8/2016 | Hurewitz et al. |

*Primary Examiner* — Erica Navar
(74) *Attorney, Agent, or Firm* — Proskauer Rose LLP

(57) ABSTRACT

Methods and apparatuses are described for dynamically generating customized content for display on a network device. A server computing device receives a plurality of data elements from a network device upon initiation of an interaction between the network device and a tag in proximity to the network device. The server generates a content payload using at least a portion of the received data elements, where the content payload comprises source code defining content for display, a style of the content for display, and a layout of the content for display. The generating step includes querying a content repository based upon the received data elements to retrieve portions of the source code and aggregating the retrieved portions of the source code to form the content payload. The server computing device receives a request for the content payload, and transmits the content payload for generation of a graphical display.

27 Claims, 14 Drawing Sheets

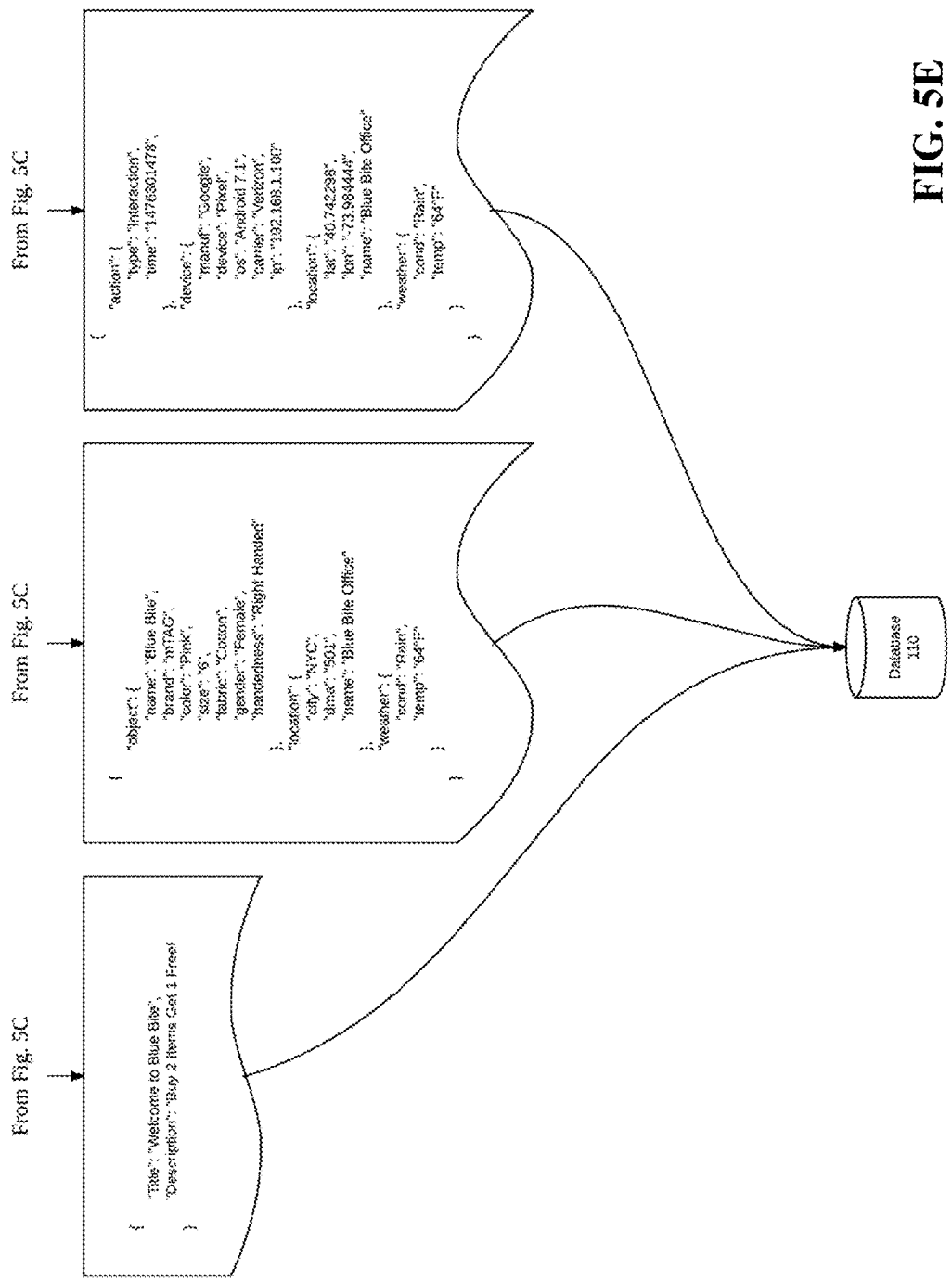

DYNAMIC GENERATION OF CUSTOMIZED CONTENT FOR DISPLAY ON A NETWORK DEVICE

TECHNICAL FIELD

This application relates generally to methods and apparatuses, including computer program products, for dynamically generating customized content for display on a network device.

BACKGROUND

Use of data-encoded tags to store and make available information about a related item has become increasingly common. Tags utilize different types of communication and encoding standards, such as Bluetooth, radio frequency identification (RFID), near-field communication (NFC), two-dimensional (2D) bar code, or quick response (QR) code, among others. Portable wireless devices, such as smartphones and tablets, are able to read the tags and collect the information stored on the tags. The typical use of such tags is to encode a static data item on the tag that acts as a pointer or an instruction to a wireless device that reads the tag. For example, the data item can include a static URL that, when accessed by the device, instructs the device to retrieve static content (e.g., a webpage, an image) from the network address identified in the URL.

However, many content delivery entities want to provide more customized and personalized content delivery to individual network devices that interact with such data-encoded tags, where the content delivery mechanism dynamically takes user-specific considerations, device-specific considerations, application-specific considerations, and even environment-specific considerations into account. Because existing tag technology is limited to having a small number of discrete and static data elements pre-encoded onto tags, such technology cannot deliver dynamically-generated, interaction-specific content to network devices in this manner.

SUMMARY

Therefore, what is needed is a method and system for dynamically generating customized content for display on a network device. The techniques described herein advantageously provide for a dynamic and flexible aggregation of source code to produce customized graphical display content based upon specific attributes and characteristics of an interaction between a network device and a tag in proximity to the network device. The methods and systems enable the delivery of customized content to a network device without requiring the content repository to be preconfigured with a limited number of static content types per interaction, or to be preconfigured with separate sets of content for all possible interactions and associated attributes.

The invention, in one aspect, features a method of dynamically generating customized content for display on a network device. A server computing device receives a plurality of data elements from a network device upon initiation of an interaction between the network device and a tag in proximity to the network device. The plurality of data elements includes tag identification data, tag location data, tag metadata, network device identification data, network device location data, network device application data, network device sensor data, user identification data, and environmental data. The server computing device generates a content payload using at least a portion of the received data elements. The content payload includes source code defining content for display, a style of the content for display, and a layout of the content for display. The server computing device queries a content repository based upon the received data elements to retrieve portions of the source code and aggregates the retrieved portions of the source code to form the content payload. The server computing device receives a request for the content payload from the network device. The server computing device transmits the content payload to the network device for generation of a graphical display using source code from the content payload.

The invention, in another aspect, features a system for dynamically generating customized content for display on a network device. The system includes a server computing device configured to receive a plurality of data elements from a network device upon initiation of an interaction between the network device and a tag in proximity to the network device. The plurality of data elements includes tag identification data, tag location data, tag metadata, network device identification data, network device location data, network device application data, network device sensor data, user identification data, and environmental data. The server computing device is configured to generate a content payload using at least a portion of the received data elements. The content payload includes source code defining content for display, a style of the content for display, and a layout of the content for display. The server computing device is configured to query a content repository based upon the received data elements to retrieve portions of the source code and aggregates the retrieved portions of the source code to form the content payload. The server computing device is configured to receive a request for the content payload from the network device. The server computing device is configured to transmit the content payload to the network device for generation of a graphical display using source code from the content payload.

The invention, in another aspect, features a computer program product, tangibly embodied in a non-transitory computer readable storage device, for dynamically generating customized content for display on a network device. The computer program product includes instructions that, when executed, cause a server computing device to receive a plurality of data elements from a network device upon initiation of an interaction between the network device and a tag in proximity to the network device. The plurality of data elements includes tag identification data, tag location data, tag metadata, network device identification data, network device location data, network device application data, network device sensor data, user identification data, and environmental data. The computer program product includes instructions that, when executed, cause the server computing device to generate a content payload using at least a portion of the received data elements. The content payload includes source code defining content for display, a style of the content for display, and a layout of the content for display. The computer program product includes instructions that, when executed, cause the server computing device to query a content repository based upon the received data elements to retrieve portions of the source code and aggregates the retrieved portions of the source code to form the content payload. The computer program product includes instructions that, when executed, cause the server computing device to receive a request for the content payload from the network device. The computer program product includes instructions that, when executed, cause the server computing device to transmit the content payload to the network device for generation of a graphical display using source code from the content payload.

Any of the above aspects can include one or more of the following features. In some embodiments, the tag comprises an NFC tag, a BLE beacon, a QR code tag, an RFID tag, a WiFi access point, a ZigBee module, or a URL. In some embodiments, the interaction comprises a scan of the tag by circuitry of the network device.

In some embodiments, the server computing device redirects the network device to a second server computing device upon generation of the content payload using a URL associated with the second server computing device, and receives the request for the content payload from the second server computing device. In some embodiments, the server computing device generates a security key associated with the content payload at the time that the content payload is generated, and transmits the security key to the second server computing device as part of the redirecting step. In some embodiments, the second server computing device retrieves the content payload using the security key.

In some embodiments, the network device uses web browser software to connect to the server computing device and to display the content payload. In some embodiments, the network device uses a native application to connect to the server computing device and to display the content payload.

In some embodiments, the server computing device retrieves source code from a third-party server computing device upon receiving the request for the content payload from the network device and adds the source code from the third-party server computing device into the content payload. In some embodiments, the network device location data comprises IP location data, GPS data or geolocation data. In some embodiments, the network device identification data comprises operating system data, manufacturer data, device type data, carrier data, or device metadata.

In some embodiments, at least a portion of the plurality of data elements received from the network device is stored in a cookie on the network device. In some embodiments, the content payload comprises a JSON file with one or more key-value pairs corresponding to the content for display, the style of the content for display, or the layout of the content for display.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIGS. 5A-5F comprise a detailed workflow diagram of a method of dynamically generating customized content for display on a network device.

DETAILED DESCRIPTION

Figure 1:
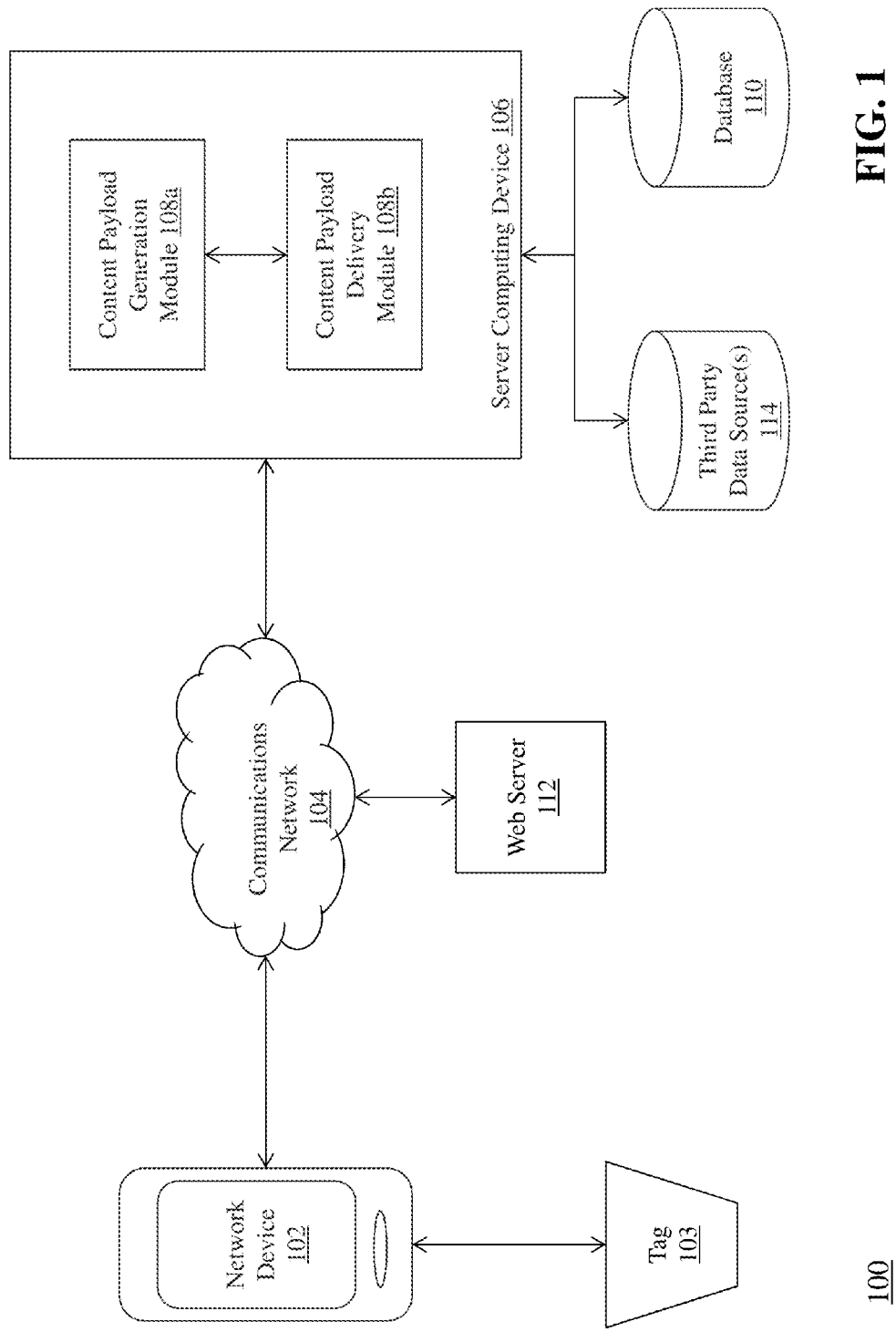
FIG. 1 is a block diagram of a system for dynamically generating customized content for display on a network device.

FIG. 1 is a block diagram of a system 100 for dynamically generating customized content for display on a network device. The system 100 includes a network device 102, one or more tags (e.g., tag 103), a communications network 104, a server computing device 106 with a content payload generation module 108a and a content payload delivery module 108b, a database 110, a web server computing device 112, and one or more other data source(s) 114.

The network device 102 uses software and circuitry (e.g., processor, memory) to execute applications, to communicate with and read information from the tag 103, and to communicate with the server computing device 106 and the web server 112 via the communications network 104 for the purpose of transmitting requests for content to, e.g., the server computing device 106 and receiving the requested content from, e.g., the web server 112. In some embodiments, the network device 102 is a mobile computing device such as a smartphone or tablet (e.g., Apple iOS Windows®, and/or Android™-based device) that uses native application software and/or browser software installed on the device to connect to the communications network 104 via embedded hardware such as a Wi-Fi antenna. Although a mobile computing device is identified herein as an exemplary embodiment, it should be appreciated that the network device 102 can be embodied in other forms—such as an Internet of Things (IoT) device, a desktop/laptop computing device, a terminal, and the like—without departing from the scope of invention.

The network device 102 can also include or otherwise be coupled to components (e.g., short-range wireless circuitry, scanner, reader) that enable the network device to electronically retrieve data from a tag 103 that is in proximity to the device 102 (e.g., BLE beacons, NFC tags, RFID tags, WiFi access points, ZigBee modules), and to read other types of tags such as bar codes or Quick Response (QR) codes via image capture and/or scanning. As such, in some embodiments the tag 103 is a type of electronic tag that communicates with the mobile device 102 via a wireless standard (e.g., RFID, NFC) or in other embodiments the tag 103 is a printed tag (e.g., barcode, QR code) that the mobile device 102 scans or reads. Generally, the tag 103 is encoded with one or more data elements—such as tag identification data, tag metadata, tag location data, and so forth—that are retrievable by the network device 102 when the tag 103 is activated, accessed or otherwise read by the device 102. In some embodiments, the tag 103 can be a Uniform Resource Locator (URL) that a user of the network device 102 enters into, e.g., browser software on the network device in order to access the related information. In some embodiments, the tag 103 is embedded in another article to which the tag 103 is logically associated—for example, the tag can be affixed to, or embedded within, an item of clothing and the tag is configured to be associated with specific characteristics and attributes of the item (e.g., color, price, size, etc.).

The communications network 104 enables components of the system 100 to communicate with each other using, e.g., a packet-based protocol. The network 104 may be a local network, such as a LAN, or a wide area network, such as the Internet. In some embodiments, the network 104 is comprised of several discrete networks and/or sub-networks (including related routing, load balancing, and traffic metering hardware).

The server computing device 106 is a combination of hardware (e.g., a processor, memory modules, other circuitry) and software—including specialized software modules 108a, 108b executing on the processor and interacting with the memory modules—to receive data from the network device 102, the data sources 110, and the web server 112, to transmit data to the network device 102, the data sources 110, and the web server 112, and to otherwise communicate with these devices 102, 110, 112 in order to perform functions for dynamically generating customized content for display on the network device 102, as described herein. The server computing device 106 includes a content payload generation module 108a and a content payload delivery module 108b (as mentioned above) that execute on and/or interact with the processor of the server computing device 106.

In some embodiments, the content payload generation module 108a and a content payload delivery module 108b are specialized sets of computer software instructions programmed onto one or more dedicated processors in the server computing device 106 and can include specifically-designated memory locations and/or registers for executing the specialized computer software instructions. Although the content payload generation module 108a and a content payload delivery module 108b are shown in FIG. 1 as executing within the same server computing device 106, in some embodiments the functionality of the content payload generation module 108a and a content payload delivery module 108b can be distributed among a plurality of server computing devices. As shown in FIG. 1, the server computing device 106 enables the content payload generation module 108a and a content payload delivery module 108b to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the content payload generation module 108a and a content payload delivery module 108b is described in detail throughout this specification.

The content payload generation module 108a communicates with the network device 102 and the data sources 110 in order to, e.g., receive requests for content from the network device 102, identify and aggregate customized content from the data sources 110 based upon the request. The content payload delivery module 108b communicates with the web server computing device 112 in order to, e.g., transfer or otherwise make the customized content available to the network device 102 via the web server 112.

The database 110 is a computing device (or in some embodiments, a set of computing devices) coupled to the server computing device 106, and the database 110 are configured to receive, generate, and store specific segments of data relating to the process of dynamically generating customized content for display on the network device 102 as described herein. In some embodiments, all or a portion of the database 110 is integrated with the server computing device 106 or in other embodiments, the database 110 is located on a separate computing device or devices. An exemplary database 110 is a MySQL™ database available from Oracle Corp. of Redwood City, Calif.

The web server computing device 110 is a computing device that provides a web-based software application accessible by browser software installed at the network device 102. For example, the web server 112 and the network device 102 can establish a communication session via HTTP (if communicating, for example, via a web browser) or other protocol (if communicating, for example, via a native app installed on the network device) to exchange requests and responses relating to the delivery of customized content to the network device 102 as described herein. It should be appreciated that a variety of different communication protocols can be used in conjunction with the systems and methods described herein.

In some embodiments, the system 100 further includes one or more other data source(s) 114 that are coupled to the communications network 104 and are accessible by the network device 102, the server computing device 106, and/or the web server 112. For example, the data source(s) 114 can comprise data feeds or resources that the other components of the system 100 access via, e.g., an application programming interface (API) in order to retrieve information relating to the customized content being provided to the network device 102.

Figure 2:
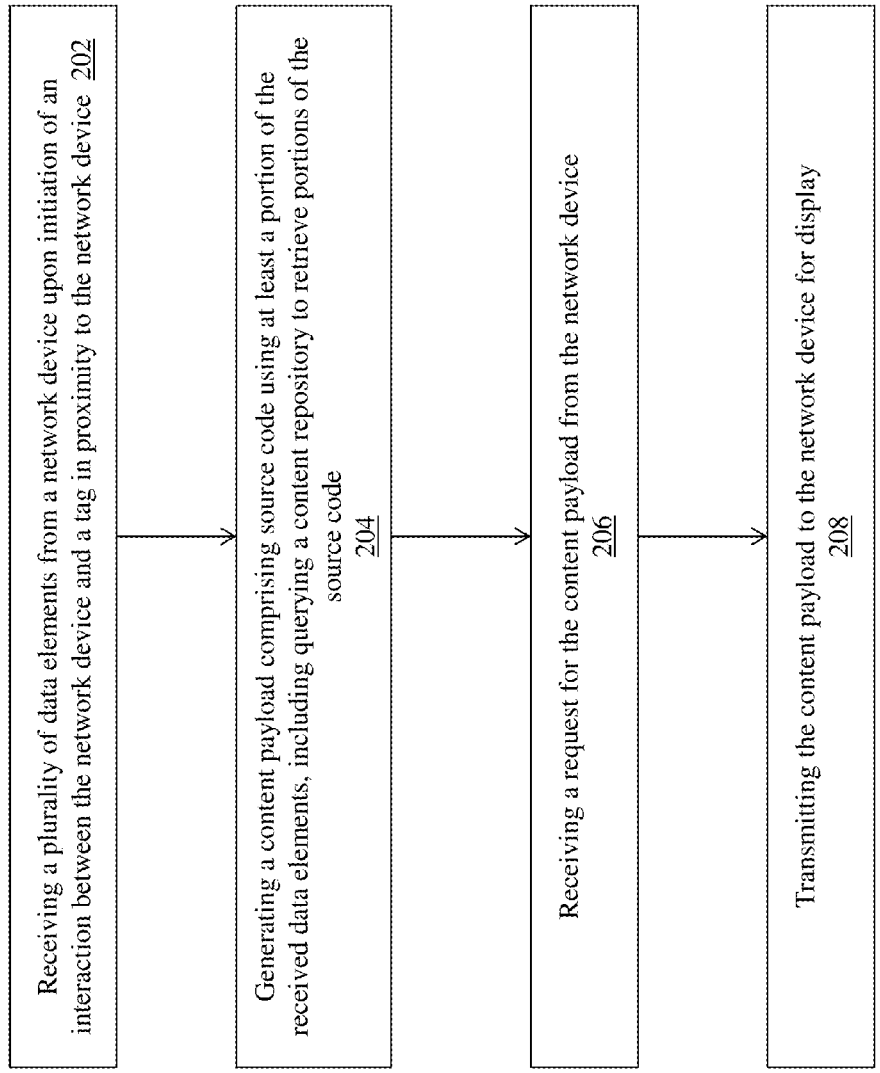
FIG. 2 is a flow diagram of a method of dynamically generating customized content for display on a network device.

FIG. 2 is a flow diagram of a method 200 of dynamically generating customized content for display on a network device (e.g., network device 102), using the system 100 of FIG. 1. The content payload generation module 108a of the server computing device 106 receives (202) a plurality of data elements from the network device 102 upon initiation of an interaction between the network device 102 and a tag 103 in proximity to the network device 102.

When the network device 102 is positioned near, brought in contact with, or otherwise communicably coupled to the tag 103, the network device 102 is configured to read certain data elements from the tag 103. The plurality of data elements that the network device 102 accesses on the tag 103 can comprise, but is not limited to, tag identification data (e.g., an object ID, an app ID, code, hardware address, or other identifier for the tag), tag location data (e.g., data that provides an indication of the physical location of the tag), and tag metadata (e.g., data about the characteristics or attributes of the tag itself and/or data about the characteristics or attributes of another item with which the tag is associated). For example, if the tag 103 is affixed to a sales display in a retail environment, the tag metadata may include data elements such as information about the attributes (e.g., color, size, model no., and brand) of the goods present on the sales display.

As mentioned above, the network device 102 reads one or more data elements from the tag 103. In some embodiments, the network device 102 further retrieves data elements associated with the network device's 102 hardware and software, a user of the network device 102, and/or an environment of the tag 103 and/or the network device 102. For example, the network device 102 can retrieve data elements such as an identifier of the network device 102 (e.g., IP address, MAC address, serial no., device name, device ID) and a location of the network device 102 (e.g., GPS coordinates, geolocation information). The network device 102 can retrieve data elements associated with the identification, status, and operation of software applications executing on the network device 102, such as native applications and/or browser-based applications. The network device 102 can retrieve data elements associated with the identification, status, and operation of hardware sensors embedded in or otherwise coupled to the network device 102, such as accelerometers, fingerprint scanners, image capture devices, microphones, buttons, light-emitting devices, and so forth. The network device 102 can retrieve data elements associated with an environment of the tag 103 and/or the network device 102, such as weather, time of day, traffic, location context (e.g., nearby points of interest), city infrastructure information (e.g., bus schedules), and the like. The network device 102 can retrieve data elements associated with a user of the network device 102, such as a user ID, name, demographic information, digital cookie, and the like.

It should be appreciated that the above-identified data elements that can be retrieved by the network device 102 automatically upon initiation of the interaction with the tag 103. For example, when the network device 102 scans, reads, or otherwise interacts with the tag 103, the network device 102 automatically aggregates the data elements into a content request. The data elements can be stored on the tag 103, locally on the network device 102, in another data source (e.g., data sources 114) that are accessible by the network device 102, or any combination thereof. During the interaction process, the network device 102 can use certain data elements retrieved from the tag 103 and/or stored locally on the network device 102 in order to retrieve other data elements that may be stored externally (e.g., on a networked data source 114). In one such example, the network device 102 can query a data source 114 using an IP address assigned to the network device 102 in order to obtain more detailed location information for the network device—such as city, state, zip and the like.

As part of the interaction between the tag 103 and the network device 102, the network device receives or otherwise obtains an app ID (e.g., URL) which the network device 102 uses to initiate communication with the server computing device 106. In one embodiment, the tag 103 may be encoded with a static URL that, when received by the network device 102, causes the network device to open local application software (e.g., a browser) and submit a request to the server computing device 106. It should be appreciated that in some embodiments, the network device 102 can receive or otherwise obtain other information about the identity of the tag 103 that the device 102 uses to initiate communication with the server computing device 106. For example, the network device 102 can read an object ID from the tag 103 and pass the object ID to a native application on the network device 102 which has an app ID (e.g., preconfigured in the application software) for the server computing device 106. In this example, the network device 102 does not retrieve an app ID from the tag 103 itself.

Once the network device 102 initiates a content request communication with the server computing device 106, the content payload generation module 108a receives the content request—including all or a portion of the data elements collected by the network device 102—and generates (204) a content payload in response to the content request. Generally, the content payload comprises source code (e.g., HTML code, JSON code) that defines the content for display on the network device 102 (e.g., links, images, text), a style of the content for display (e.g., font, color, formatting, and so forth), and a layout of the content for display (e.g., where the content is positioned on the screen of the network device 102). The source code is configured to be part of the generation of a graphical display on the network device 102 when the source code is parsed by an application of the network device 102.

As part of the content payload generation process, the content payload generation module 108a uses at least a portion of the data elements submitted from the network device 102 in the request in order to query the database 110 for retrieval and aggregation of portions of the source code into the content payload. In an exemplary embodiment, the content payload generation module 108a dynamically generates a query comprised of key-value pair expressions united by logical operators that, when executed against the database 110, returns source code relating to one or more of content to be displayed, a style of the content to be displayed, and a layout of the content to be displayed. This distinctive query language enables the content payload generation module 108a to retrieve and aggregate specific source code based upon a wide variety of attributes and generate a content payload that may be different for each individual user/network device but is capable of being displayed via the same type of request—thereby creating a dynamic content generation methodology that can be delivered over an existing, common request framework. Further detail with respect to the content payload generation and delivery is described below with respect to FIG. 3.

Figure 3:
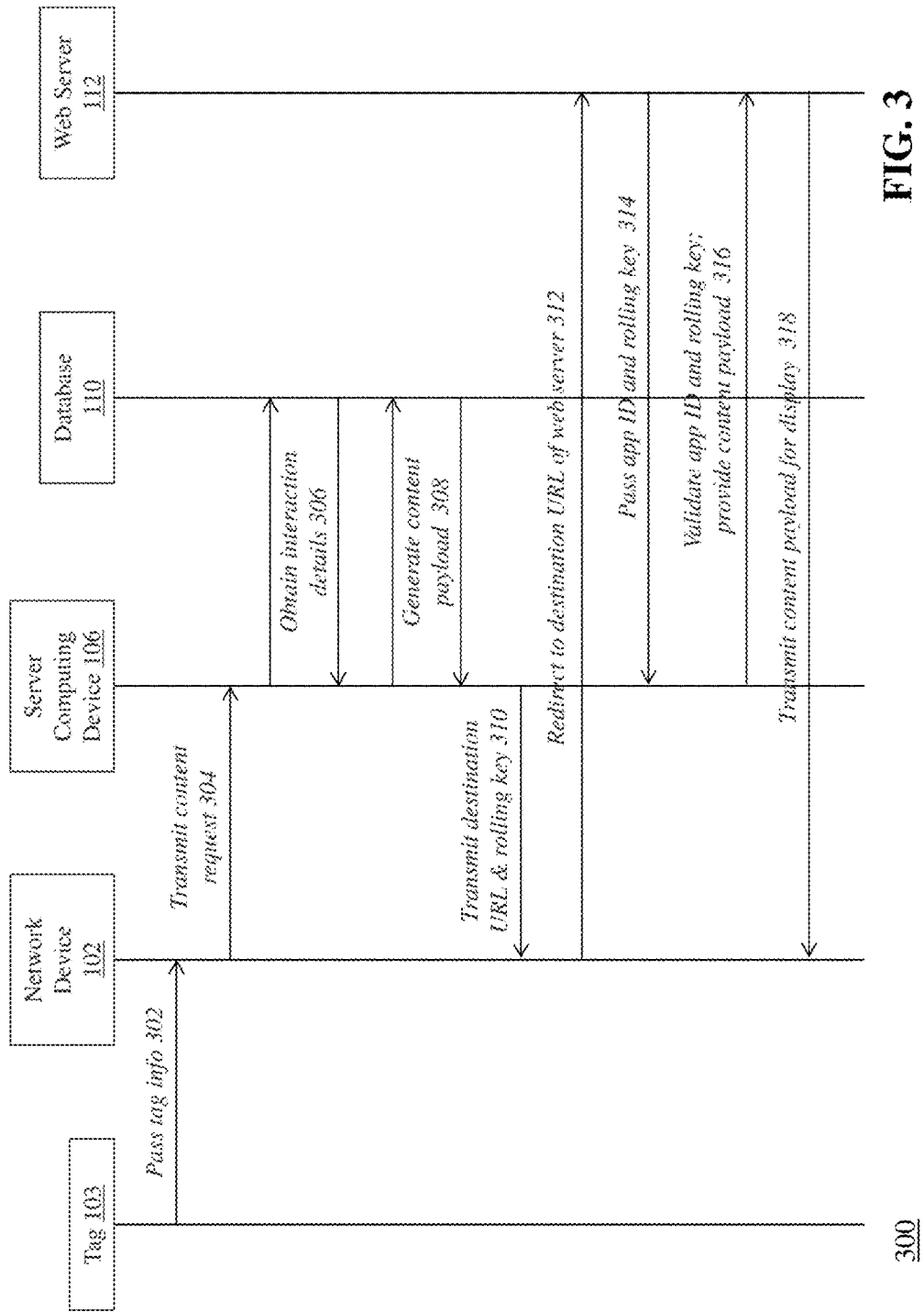
FIG. 3 is a ladder diagram of a method of dynamically generating customized content for display on a network device.

FIG. 3 is a ladder diagram of a method 300 of dynamically generating customized content for display on a network device, using the system 100 of FIG. 1. For the purposes of explanation, FIG. 3 is described in the context of an example use case for the system 100. In this use case, a user with a network device (e.g., GooglePixel™) enters a shoe store on a rainy Monday afternoon in New York City and browses the shoes for sale. Each shoe is associated with a tag located in proximity to the shoe. In one example, the tag may include an indication for the user to have his network device interact with the tag (e.g., 'tap here') to get more information or special offers.

When the user's network device 102 interacts with the tag 103, the tag 103 passes (302) certain tag-related data elements to the network device 102. As described previously, the tag-related data elements can include, but is not limited to, tag identification data (e.g., an object ID, an app ID, code, hardware address, or other identifier for the tag), tag location data (e.g., data that provides an indication of the physical location of the tag), and tag metadata (e.g., data about the characteristics or attributes of the tag itself and/or data about the characteristics or attributes of another item with which the tag is associated). In this example, the tag 103 passes a URL and an object ID to the network device 102.

The network device 102 collects additional data elements using components and capabilities of the network device 102, such as: network device application data; location data (e.g., GPS coordinates) of the present location of the network device (e.g., as maintained by the network device and/or the carrier network); a type of network device (e.g., GooglePixel™) a type of operating system of the network device (e.g., Android™); interaction timestamp data (e.g., the current date and time); and user profile data (e.g., user ID). The network device 102 launches browser software with the URL received from the tag 103, and establishes a connection with the server computing device 106 using the URL. The network device 102 transmits (304) the plurality of data elements collected from the tag and collected from the network device to the server computing device 106 as a request for content to be delivered to the network device 102.

The content payload generation module 108a of the server computing device 106 receives the request for content, and associated data elements, from the network device 102. Using the data elements in the request for content, the content payload generation module 108a obtains additional details associated with the interaction between the network device and the tag from the database 110 in order to build a query for generation of the content payload.

For example, the database 110 includes data structures that store detailed information about the shoe associated with the tag 103 scanned by the network device 102 (e.g., size, color, brand, and the like). In some embodiments, the content payload generation module 108a retrieves additional details about various aspects of the interaction between the network device and the tag from one or more other data sources 114. For example, the content payload generation module 108a can use the GPS coordinates received as part of the request for content in order to determine, e.g., a city where the network device 102 is located, by transmitting the GPS coordinates (e.g., via API) to a third-party mapping service, such as Google Maps, which returns specific location information (e.g., street address) associated with the coordinates. In this example, the content payload generation module 108a determines that the network device 102 is located in 'New York' according to its current GPS coordinates. In another example, the content payload generation module 108a then uses the city information to retrieve current weather conditions (e.g., rainy and 65°) from a third-party weather service.

Once the content payload generation module 108a has received or otherwise obtained a plurality of data elements associated with the interaction between the network device 102 and the tag 103, the content payload generation module 108a builds a query that is executed against a content repository (e.g., database 110) in order to identify and aggregate certain items of content—along with aspects of content style and/or layout—into the content payload to be displayed on the network device 102.

An exemplary query generated by the content payload generation module 108a for the example use case described with respect to in FIG. 3 is referenced below:

shoe.size is "12" AND shoe.color is "blue" AND today is "Monday" AND weather.rain is "true" and device.os.name is "Android" AND device.location.city is "New York"

As shown above, the query is comprised of expressions (e.g., "shoe.size is '12'") joined by logical operators (e.g., "AND"). Each expression is comprised of a key that defines a particular attribute of the interaction (e.g., "shoe.size"), a value that defines the value assigned to the key (e.g., "12"), and a comparison operator (e.g., "is"). It should be appreciated that the comparison operator is generally a Boolean operator that takes two parameters for comparison (e.g., equals, not equals, like, not like, in, not in, is, is not, etc.). In addition, a logical operator is generally an operator that combines multiple expressions into a query (e.g., "AND," "OR," "NOT", etc.). Other types of comparison operators and logical operators can be used with the methods and systems described herein.

It should also be appreciated that the query building described herein is dynamic and can involve any number of different expressions joined by any number of logical operators. The system 100 does not require the same set of expressions joined in the same way for each query; instead, the system 100 can adapt the query based upon, e.g., the data elements that are available and/or specific data elements configured by operators of the system.

The content payload generation module 108a executes the query against the content repository (e.g., database 110) to generate (308) the content payload. The content repository returns source code that satisfies the query, and the content payload generation module 108a aggregates the received source code into the content payload for storage in database 110.

Figure 4:
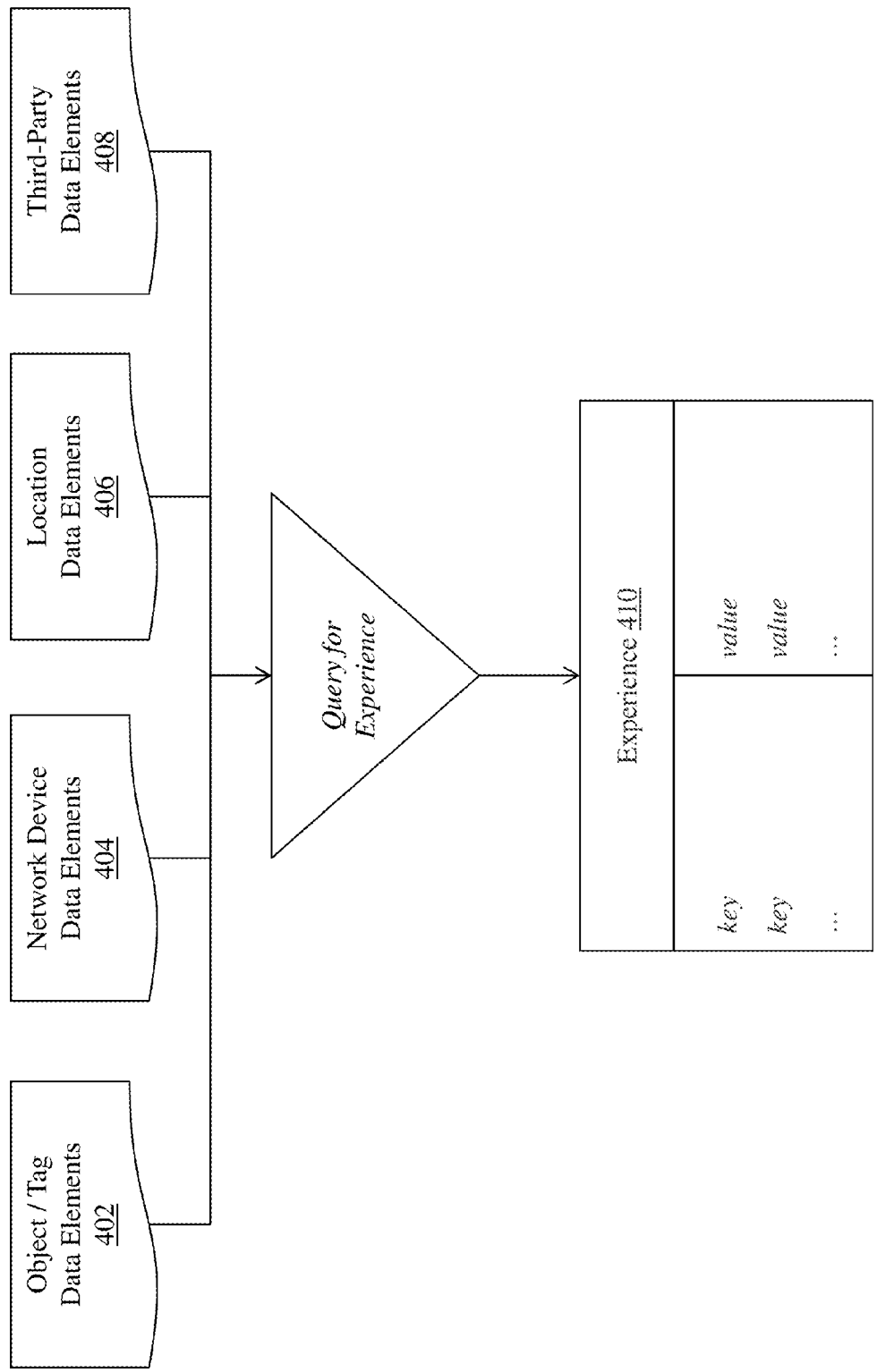
FIG. 4 is a flow diagram of a method for querying the content repository for an experience associated with a plurality of interaction data elements.

In some embodiments, the content payload generation module 108a uses the object ID, by itself or in conjunction with other data elements associated with the interaction, as received from the network device 102 to determine a specific set of keys (also called an experience) to be used in the retrieval of content. For example, the database 110 can be configured to map a certain object ID (or a certain entity ID associated with a set of object IDs) to an experience that comprises a predefined set of keys for expressions to be included in the query. As shown in FIG. 4, the content payload generation module 108a can include data elements associated with several aspects of the interaction (e.g., object/tag data elements 402, network device data elements 404, location data elements 406, third-party data elements 408) in a query to determine whether the content repository includes one or more specific experiences (e.g., experience 410) and corresponding key-value pairs, for those data elements.

The content repository can further evaluate the query to determine attachments to be included in the content payload based upon, e.g., the data elements associated with the interaction. For example, the content repository evaluates the logic of the query to identify specific attachments (e.g., content items, styles, and/or layouts) that satisfy the logic. For example, the content repository can determine that for each interaction that satisfies all of the elements of the query identified above, the image file located at http://bluebite.com/images/brand-logo-dark.svg is included in the content payload. In one embodiment, the content repository returns the link to the image file to the content payload generation module 108a, and the module 108a attaches the link to the content payload for that interaction. In another example, the content repository can determine that, for all interactions that involve an iOS device, a specific style and/or layout is to be applied to the content. The content repository returns, e.g., a link to a stylesheet file to the content payload generation module 108a, and the module 108a attaches the link to the content payload. In some embodiments, the attachments to the content payload are comprised of source code including the key-value pairs in a JSON wrapper for interpretation by the downstream web server 112.

In some embodiments, the content payload generation module 108a can be configured to manipulate certain aspects the content payload before it is transmitted to the network device 102. One example of this process, called whitelisting, acts to adjust visual aspects of the data elements that are present in the content payload with respect to, e.g., whether the data element is displayed on the network device 102 and/or how the data element is displayed. In the example described above, a brand manager may want to prevent certain attributes of the shoe (e.g., a type of plastic used in the shoe) from being displayed on the network device or otherwise presented to the user. The content payload generation module 108a can be configured to rename, map, and/or filter data elements (e.g., by changing the value of the data elements, by flagging certain data elements as 'do not display', and so forth) by referencing a whitelist stored in database 110 during generation of the content payload.

In this manner, the content payload generation module 108a generates a dynamic content payload with any number of different attachments that collectively contribute to the content displayed on the network device 102—based upon the specific details of the interaction between the tag and the network device described previously. The content payload is further associated with a unique app ID and a unique object ID so that the content payload can be later identified. As can be appreciated, the techniques described herein provide the advantage of an interaction-specific content generation and delivery to the network device 102, such that the content is uniquely tailored to each interaction—without requiring the tag 103 and/or the backend content delivery system to be preconfigured with a limited number of static values (thereby resulting in only a few predefined content experiences) or to be preconfigured for all possible interactions and associated attributes (which is likely impossible).

FIGS. 5A-5F comprise a detailed workflow diagram of a method of dynamically generating customized content for display on a network device, using the system 100 of FIG. 1. Starting with FIG. 5A, the network device 102 interacts with the tag 103 (also called an object) and retrieves the identifier (e.g., URN '12345678') from the tag 103. An application executing on the network device 102 receives the object URN and generates a request message to be sent to the server computing device 106 (e.g., via network 104) using an SDK embedded within the application. As mentioned above, the request message can include a number of different data elements, including but not limited to object URN, app key (e.g., an identifier associated with the SDK), type of action (e.g., an 'interaction'), user agent, and device data.

Figure 5A:
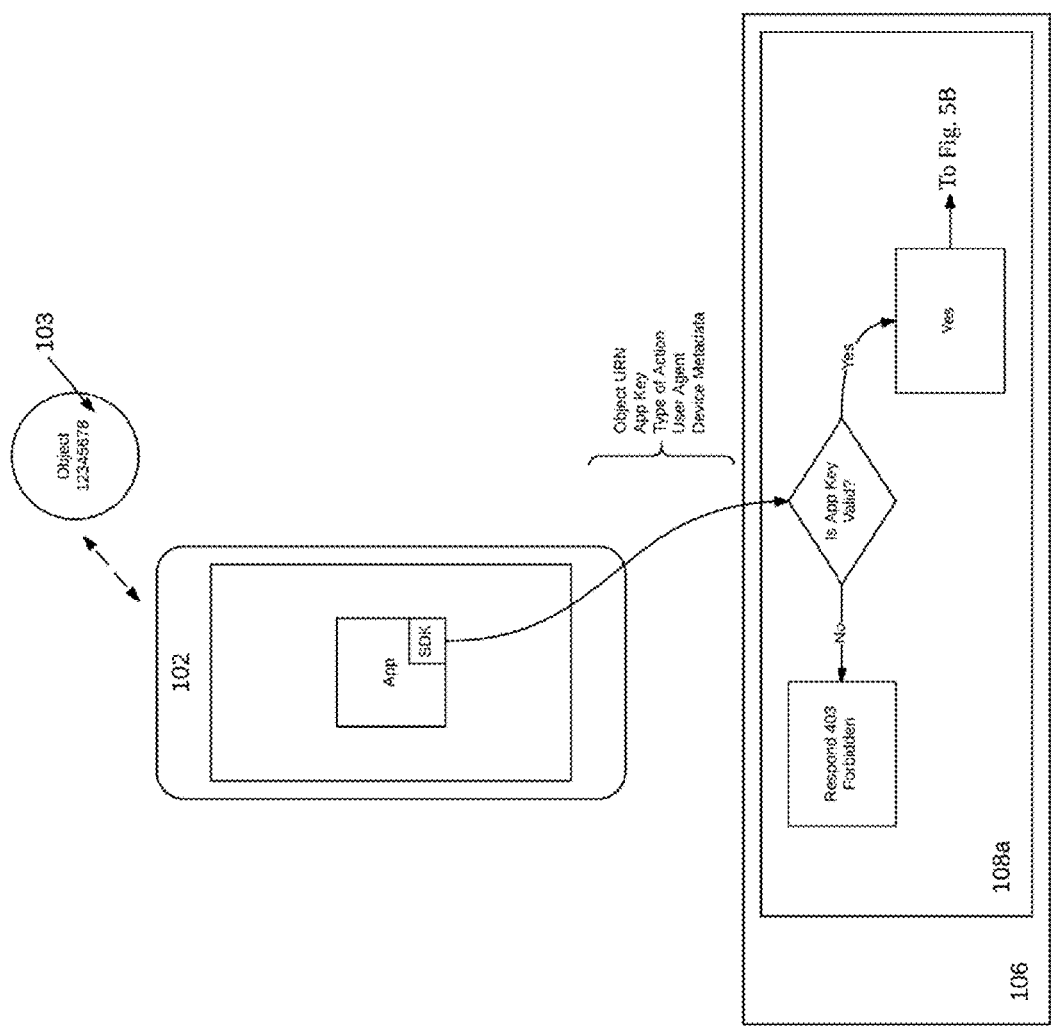
Figure 5B:
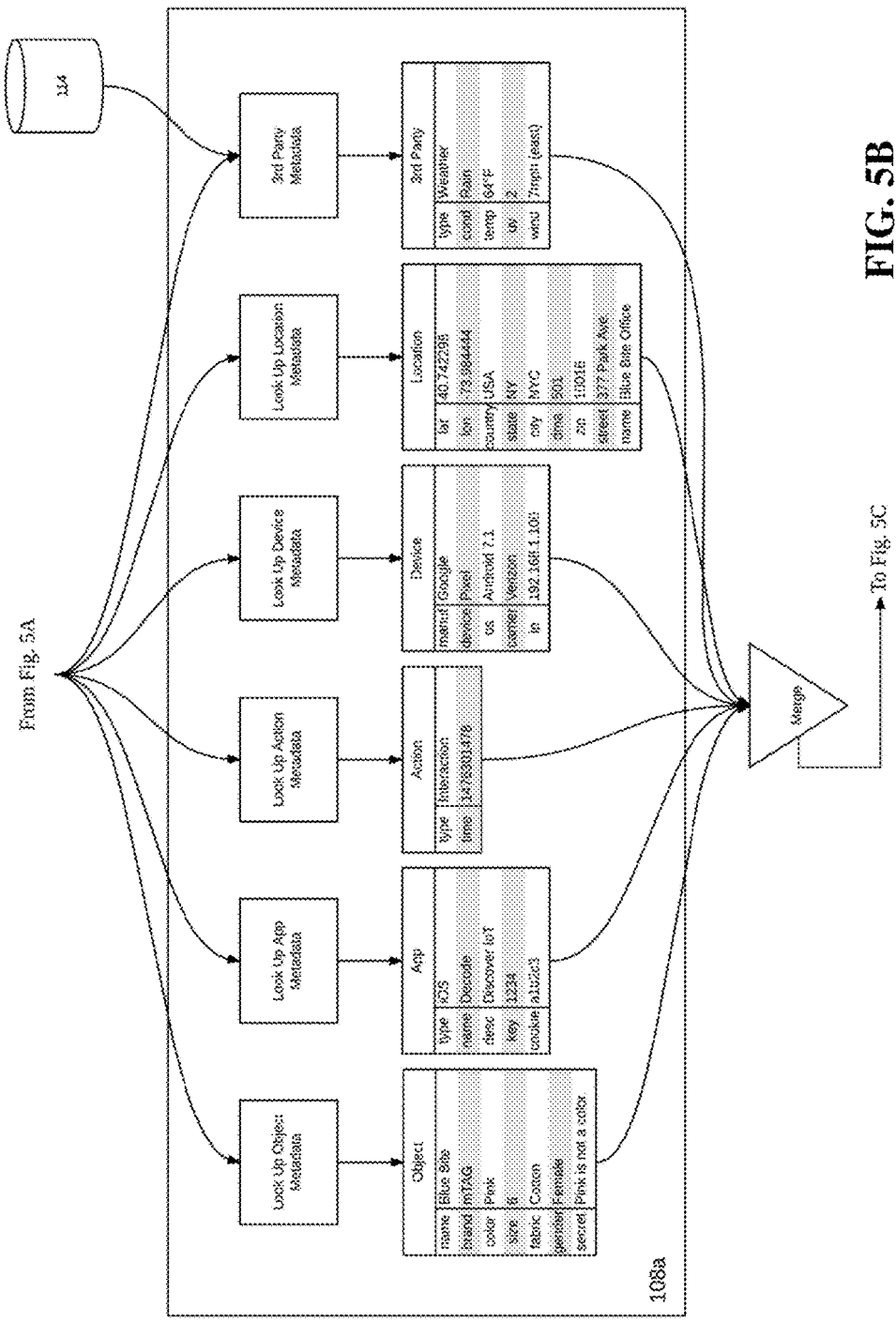

The content payload generation module 108a of the server computing device 106 receives the request message. First, the content payload generation module 108a determines whether the app key is valid to ensure that only requests from authorized apps are processed by the module 108a. If the module 108a determines that the app key is invalid, the module 108a returns a 403 Forbidden response to the network device 102. If the app key is valid, the module 108a continues with the payload generation—as shown in FIG. 5B.

Figure 5C:
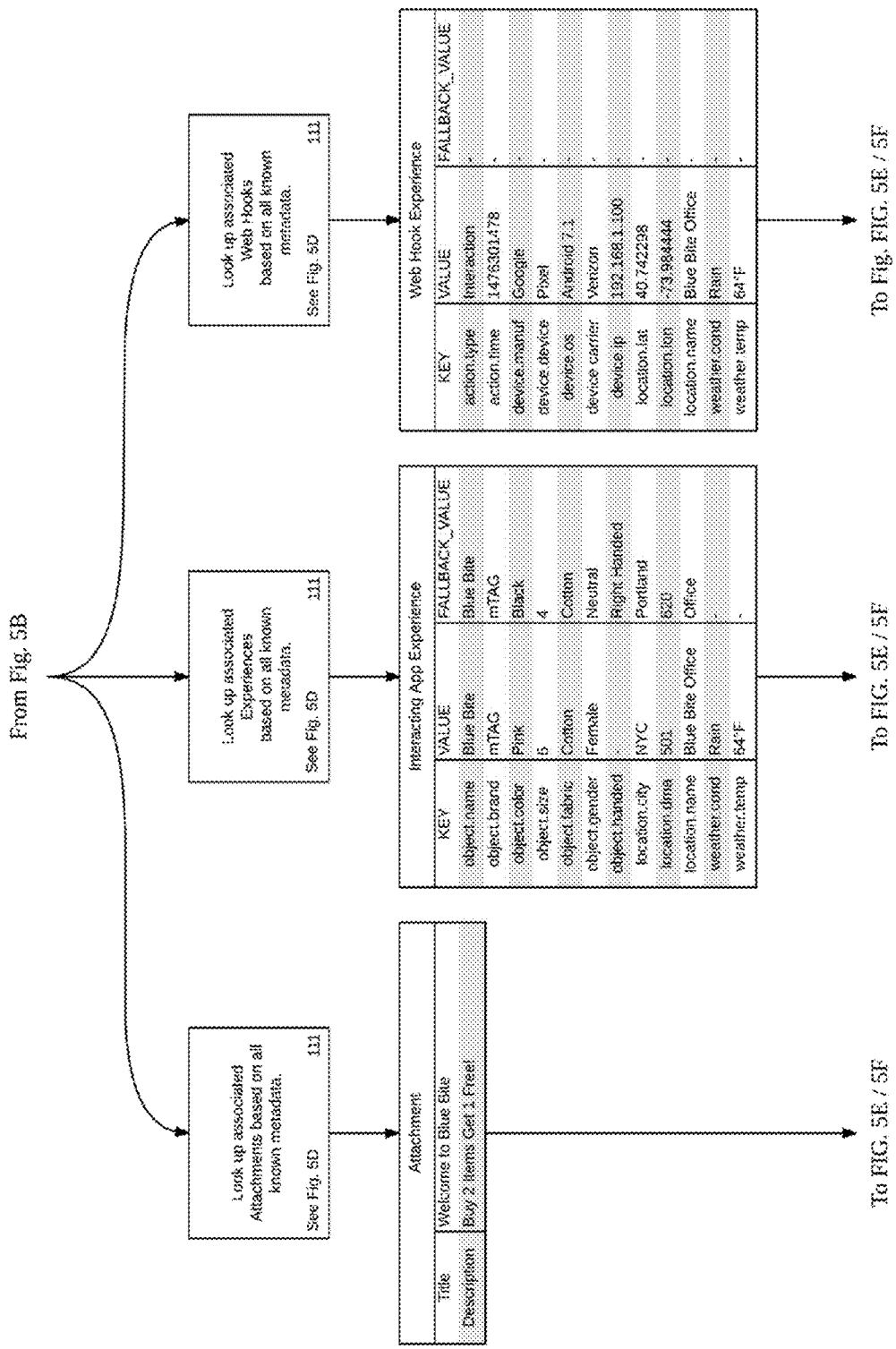

The module 108a then accesses the database 110 using the data elements from the request message as received from the network device 102 to retrieve additional data elements (e.g., metadata) for generating the content payload. As shown in FIG. 5B, the module 108a looks up (i) object metadata using the object URN; (ii) app metadata using the app key; (iii) action metadata based upon the type of action; (iv) device metadata using the device data; (v) location metadata using, e.g., geolocation coordinates from the network device 102; and (vi) third-party metadata (such as environment data) using, e.g., the network device 102 location and the third-party data sources 114. Exemplary metadata is shown in FIG. 5B, and it should be appreciated that other types and/or sources of metadata can be contemplated to be within the scope of invention. Once the module 108a has retrieved the applicable metadata, the module 108a merges the metadata into, e.g., a single set of metadata to be used in generating the content payload—as shown in FIG. 5C.

The module 108a then queries (111) the database 110 using the merged metadata to retrieve associated items such as attachments to be included in the content payload, as well as populating the experience key-value pairs with metadata from the interaction between the network device 102 and the tag 103. In some embodiments, during each interaction every assignment query (e.g., for all attachments, experiences, and web hooks) is evaluated against the input metadata parameters to determine which are relevant for the response. The dynamic nature of the assignment query language described herein provides the distinct advantage of enabling content to be assigned to a plurality of object attributes, instead of a static object ID (which is the technique employed in systems using traditional barcode, NFC, RFID, and Beacon technology). As a result, new objects can be introduced to the system 100 and the content payload generation module 108a automatically determines how to serve the most appropriate response to provide content to the network device 102.

Figure 5D:
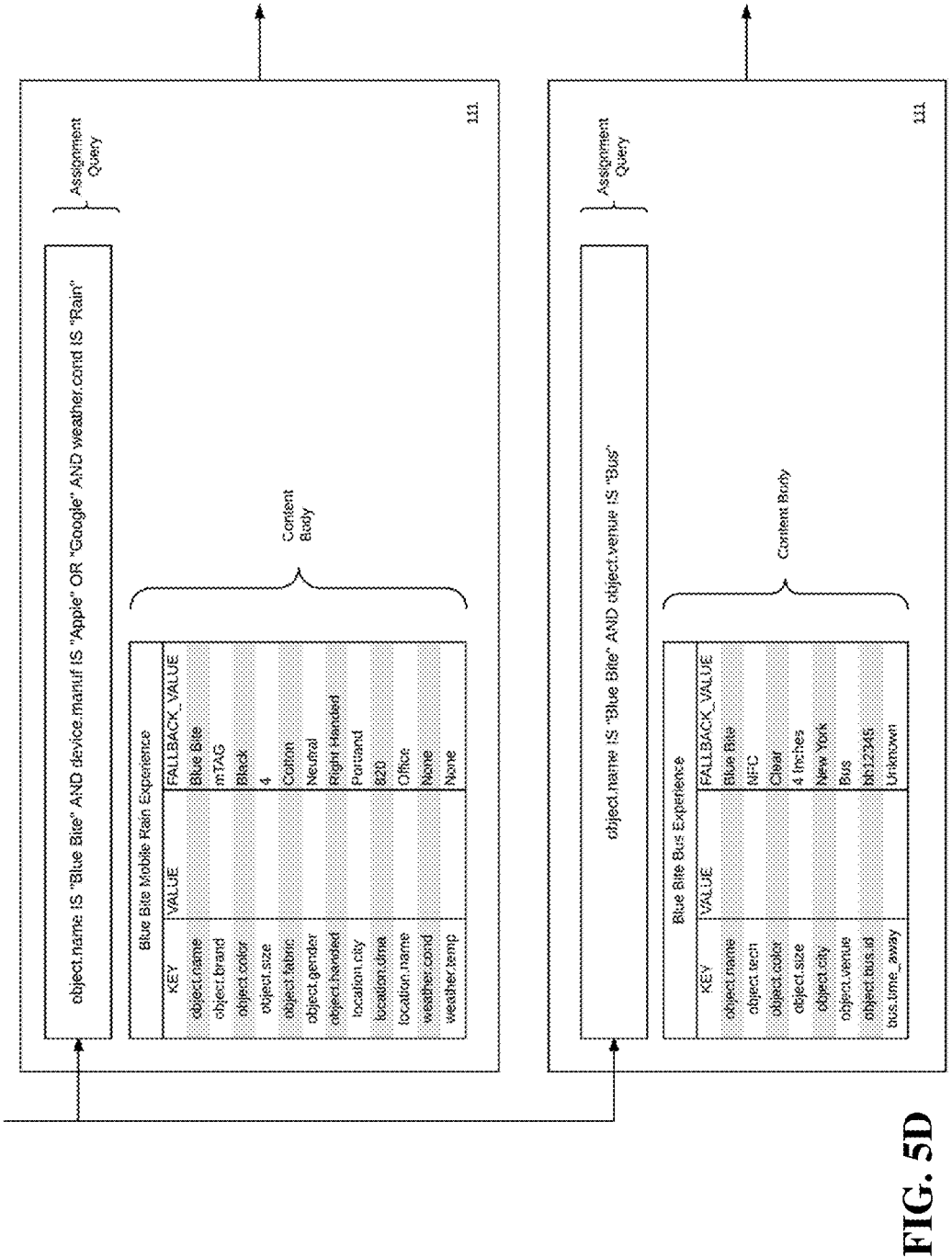

Referring now to FIG. 5D, the module 108a evaluates the available assignment queries against the merged metadata in order to retrieve applicable experience data. As shown in FIG. 5D, the exemplary assignment queries comprise a series of expressions (e.g., object.name IS "Blue Bite") that are joined together with logical operators (e.g., "AND"). It should be appreciated that the ordering of the expressions in the queries is not arbitrary. Instead, the queries are self-optimized by the module 108a so that expressions with local keys (e.g., object.name, device.manuf, object.venue)—that is, keys can be evaluated against database 110 which is typically faster for the module 108a to access and receive a response—are arranged before expressions with keys that require access to external resources (e.g., weather.cond) because external resources are typically slower for the module 108a to access and receive a response. In this way, when the query is executed, the module 108a evaluates the local keys before the external keys, resulting in a more efficient response time. This self-optimization process also provides the advantage of giving users of the system the direct ability to control what external resource requests that the system makes during each interaction.

Furthermore, the content body examples provided in FIG. 5D are shown as not having values filled in for the corresponding keys. It should be appreciated that the module 108a fills in these values after an assignment query is successfully executed by the module 108a and the retrieved content is set to be added to the interaction response.

Figure 5F:
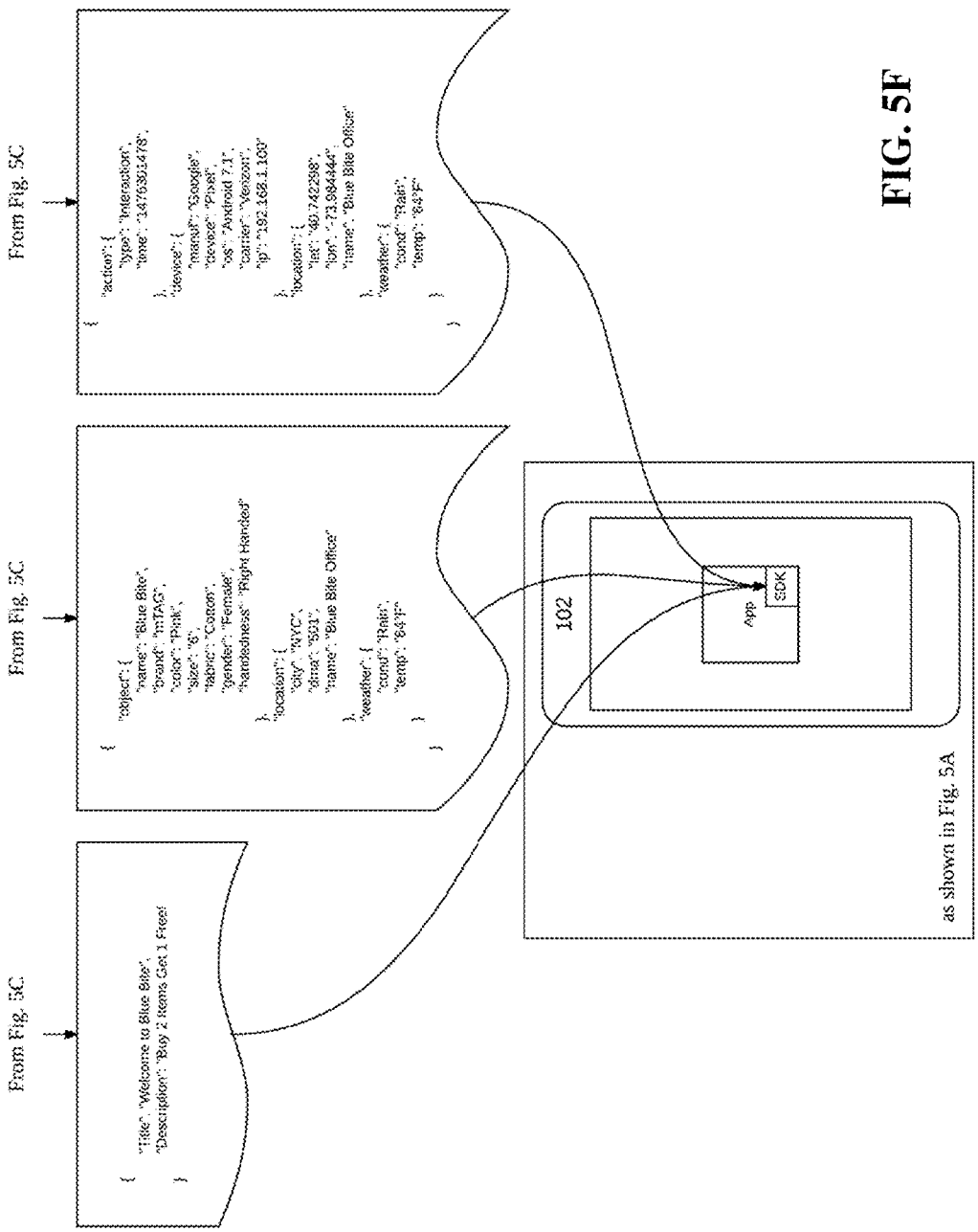

Turning back to FIG. 5C, upon executing the queries, the module 108a adds values to the applicable experience keys using the query results. As shown in FIG. 5C, each experience includes a series of keys with corresponding values that the module 108a maps based upon the data elements it received as part of the request message and/or retrieved from the database 110. In one example, the value for the 'object.handed' key is blank—meaning that in some cases the interaction metadata does not include a value for that key. In this instance, the module 108a can set the key's value to a fallback value—i.e., a value that is preconfigured in the experience. FIG. 5C shows a number of different fallback values for the various keys. Once the module 108a has retrieved any associated attachments and mapped the metadata to the experiences, the module 108a then generates the JSON payload data using the key-value pairs for each of the aspects of the content payload, and the server computing device 106 can perform a variety of different actions using the JSON payload data, examples of which are shown in FIGS. 5E and 5F. One example is to store the payload data in database 110—in FIG. 5E, the payload data is packaged as a content payload for storage in database 110 and later transmission to, e.g., the web server 112 as described herein. Another example is to transmit the payload data back to the network device 102 (from FIG. 5A) that originally requested the content payload—in FIG. 5F, the payload data is sent to the SDK embedded in the app on the network device 102 that requested the content (such as an external server, personal mobile device, or web hook) for subsequent display on a network device 102—as described in greater detail below.

Once the content payload generation module 108a and the content repository have completed the generation of the content payload as described above, the content payload generation module 108a retrieves a destination URL associated with the interaction from, e.g., database 110. For example, the destination URL can be associated with a web server (e.g., web server computing device 112) of an entity associated with the product being viewed by the user. The content payload generation module 108a also assigns a unique identifier to the content payload that is used for subsequent retrieval of the content payload as described below.

In some embodiments, the unique identifier assigned to the content payload is a rolling encryption key (e.g., a JavaScript rolling key) that expires after a set period of time. In this way, the content payload for a particular transaction can be time-limited, in that the payload cannot be accessed more than a predetermined period of time from the initial interaction between the tag and the network device. In other embodiments, the rolling encryption key can be configured to expire after the corresponding content payload is accessed a certain number of times, or in still other embodiments, the rolling encryption key can be specific to a network device and/or user agent—such that only the authorized network device can access the content payload.

Returning to FIG. 3, the content payload generation module 108a transmits (310) the destination URL and the rolling encryption key (e.g., http://url.tld/?rk=xyz123) to the network device 102. Using the destination URL, the network device 102 is redirected (312) to the web server 112 and establishes a communication session with the web server. In some embodiments, the web server 112 is configured with functionality (e.g., an SDK) that enables the web server 112 to request and retrieve the content payload from the server computing device 106. When the network device 102 is redirected to the web server 112, the web server loads a web page for display on the network device 102.

In some embodiments, the web page includes source code that references or otherwise integrates the SDK to automatically retrieve the content payload from the server computing device 106 (e.g., via API call). For example, as part of the page load, the SDK on the web server 112 reads the rolling encryption key received from the network device 102 as part of the destination URL, and initiates an API call that passes (314) the app ID and the rolling encryption key to the content payload delivery module 108b of the server computing device 106.

The content payload delivery module 108b validates (316) the app ID and the rolling encryption key, and responds to the API call from the web server 112 by retrieving the appropriate content payload assigned to the app ID and rolling encryption key from the database 110 and transmitting the content payload to the web server 112. It should be appreciated that, in some cases, the API call is performed by the web server 112 on behalf of the network device 102 and in other cases, the network device 102 (e.g., either via app or browser) executes the API call via the web server 112 to retrieve the content payload and populate the display. Furthermore, in some embodiments, secondary requests made by the web server 112 are AJAX calls. The web server 112 then transmits (318) the content payload to the network device 102, where the content payload is used to populate specific areas of the web page and create a customized, dynamic content display for the user.

Figure 6A:
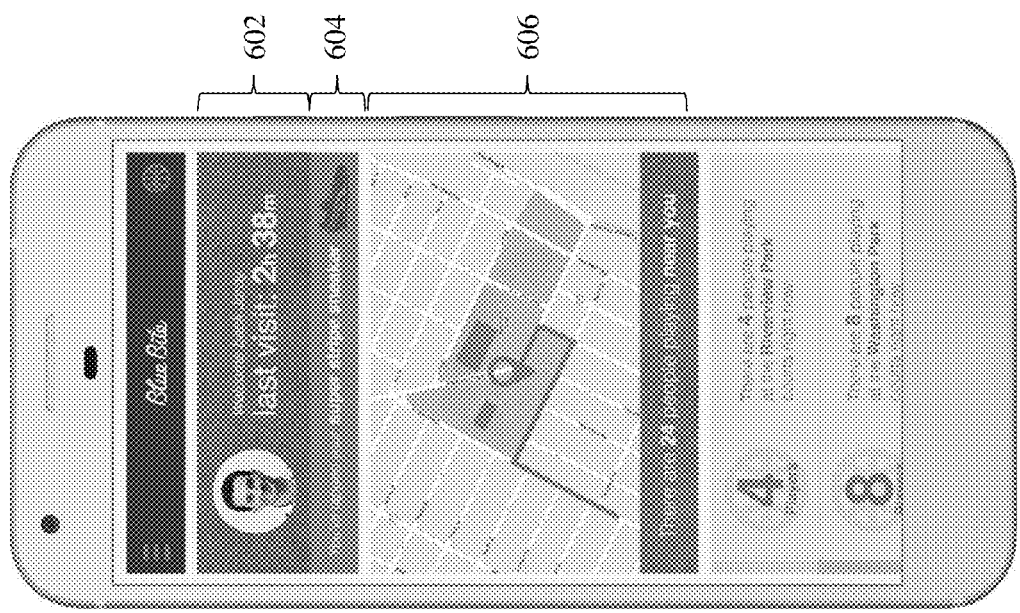
FIGS. 6A-6D comprise exemplary screenshots of a graphical display based upon the content payload generated by the system.
Figure 6B:
Figure 6C:

FIGS. 6A-6C are exemplary screenshots of a customized content display on a network device 102, as generated by the methods and systems described herein. As shown in FIG. 6A, the graphical display on the network device 102 includes several different content areas 602, 604, 606 that correspond to aspects of the content payload delivered to the network device 102. For example, content area 602 includes user-specific data (e.g., name='Jordy'; history='last visit: 2 h 38 m') as contained in the content payload. Content area 604 includes product-specific data (e.g., product name, product image) of the product associated with the tag or object 103 that the network device 102 has interacted with (e.g., a basketball sneaker). As set forth previously, the content payload can include, e.g., a link to an image file that is subsequently retrieved by the web server 112 when the graphical display is presented on the network device 102. Content area 606 includes location-specific data (e.g., a map of the location around the device, as retrieved from a third-party service such as GoogleMaps™ API.

As shown in FIG. 6B, the graphical display includes content areas 608, 610 utilizing data from the content payload which corresponds to, e.g., details about the product associated with the tag 103 that the network device 102 has interacted with (e.g., a running jacket) and past purchases by other users that have purchased the product. Content area 608 includes attributes of the product such as color, item name, price, size, images, description, materials, and the like that directly correspond to the physical item associated with the tag that the network device 102 has interacted with. Content area 610 includes product images and product names for similar products that other users may have purchased or interacted with, based upon the primary product (running jacket) that the network device 102 is displaying.

As shown in FIG. 6C, the graphical display includes content areas 612, 614 utilizing data from the content payload which corresponds to, e.g., location and environment-based information associated with the location of the network device 102 in conjunction with the specific product. For example, because the product is a running jacket, the content payload can include information about running conditions in the area of the network device 102—including weather forecast data, precipitation data, and the like—for display on the network device. Other types of information in the content payload for display can include, but are not limited to, map data (including location of nearby users who are also accessing the app), run history data (e.g., fastest run, total miles), badges and leaderboard data, and social media data (e.g., Instagram™ photos).

Figure 6D:
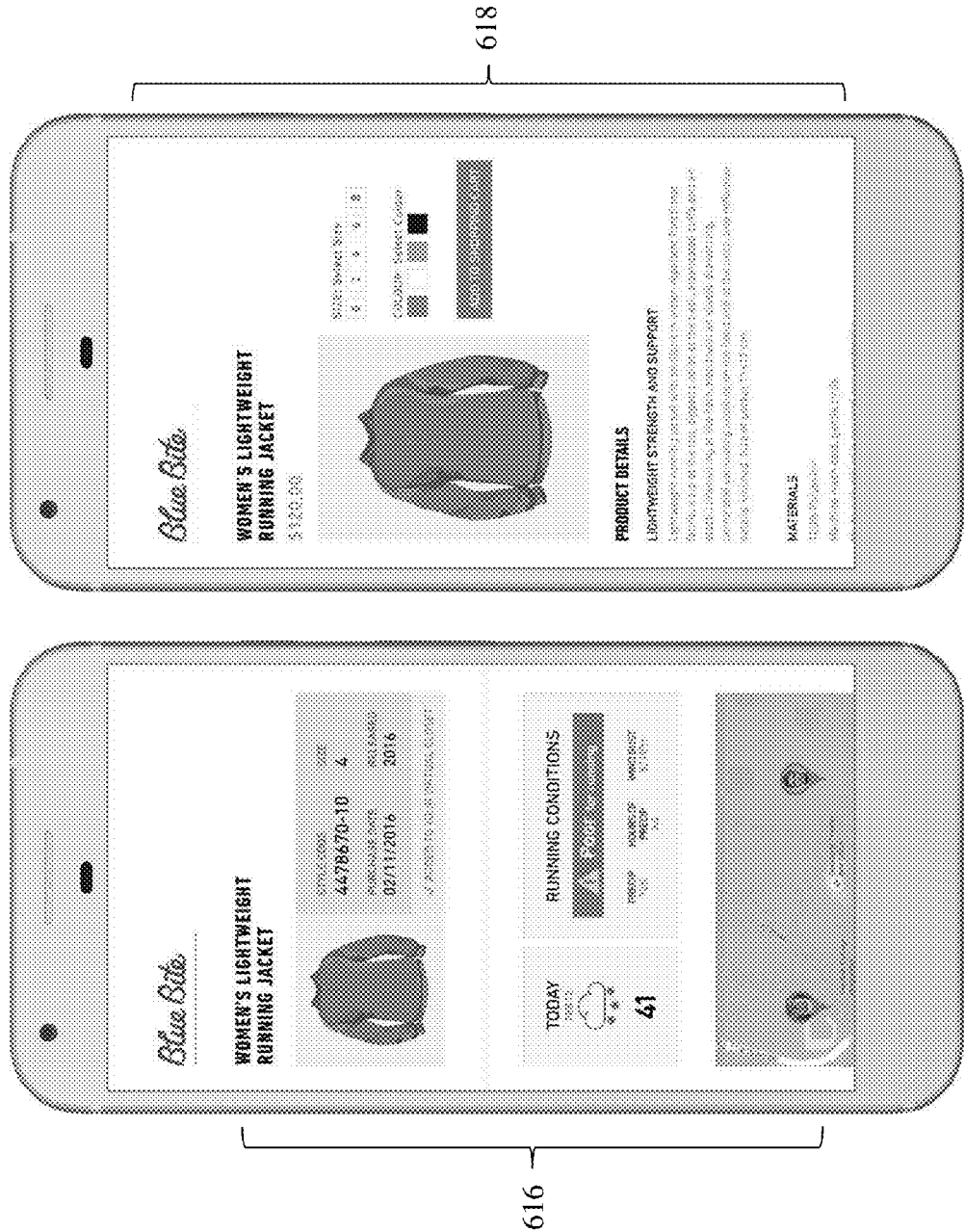

Further, FIG. 6D shows how the graphical displays are dynamically customized based upon the specific context in which the network device 102 interacts with the tag 103. As shown in FIG. 6D, the left-hand network device shows a graphical display 616 based upon a content payload that corresponds to a user that has already purchased the running jacket—including information such as running conditions, weather data, map data and the like. The right-hand network device shows a graphical display 618 based upon a content payload that corresponds to a user that has not purchased the jacket. As such, the display shows product information such as size and color options, description, materials, and so forth.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device such as the Pixel™ from Google Inc. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method of dynamically generating customized content for display on a network device, the method comprising:

receiving, by a server computing device, a plurality of data elements from a network device upon initiation of an interaction between the network device and a tag in proximity to the network device, wherein the plurality of data elements comprise tag identification data, tag location data, tag metadata, network device identification data, network device location data, network device application data, network device sensor data, user identification data, and environmental data;

generating, by the server computing device, a content payload using at least a portion of the received data elements, wherein the content payload comprises source code defining content for display, a style of the content for display, and a layout of the content for display, the generating step including querying a content repository based upon the received data elements to retrieve portions of the source code and aggregating the retrieved portions of the source code to form the content payload;

receiving, by the server computing device, a request for the content payload from the network device; and transmitting, by the server computing device, the content payload to the network device for generation of a graphical display using source code from the content payload.

2. The method of claim 1, wherein the tag comprises an NFC tag, a BLE beacon, a QR code tag, a bar code tag, an RFID tag, a WiFi access point, a ZigBee module, or a URL.

3. The method of claim 1, wherein the interaction comprises a scan of the tag by circuitry of the network device.

4. The method of claim 1, further comprising redirecting, by the server computing device, the network device to a second server computing device upon generation of the content payload using a URL associated with the second server computing device; and receiving, by the server computing device, the request for the content payload from the second server computing device.

5. The method of claim 4, further comprising generating, by the server computing device, a security key associated with the content payload at the time that the content payload is generated; and transmitting, by the server computing device, the security key to the second server computing device as part of the redirecting step.

6. The method of claim 5, further comprising retrieving, by the second server computing device, the content payload using the security key.

7. The method of claim 1, wherein the network device uses web browser software to connect to the server computing device and to display the content payload.

8. The method of claim 1, wherein the network device uses a native application to connect to the server computing device and to display the content payload.

9. The method of claim 1, further comprising retrieving, by the server computing device, source code from a third-party server computing device upon receiving the request for the content payload from the network device and adding the source code from the third-party server computing device into the content payload.

10. The method of claim 1, wherein the network device location data comprises IP location data, GPS data or geolocation data.

11. The method of claim 1, wherein the network device identification data comprises operating system data, manufacturer data, device type data, carrier data, or device metadata.

12. The method of claim 1, wherein at least a portion of the plurality of data elements received from the network device is stored in a cookie on the network device.

13. The method of claim 1, wherein the content payload comprises a JSON file with one or more key-value pairs corresponding to the content for display, the style of the content for display, or the layout of the content for display.

14. A system for dynamically generating customized content for display on a network device, the system comprising a server computing device configured to:

receive a plurality of data elements from a network device upon initiation of an interaction between the network device and a tag in proximity to the network device, wherein the plurality of data elements comprise tag identification data, tag location data, tag metadata, network device identification data, network device location data, network device application data, network device sensor data, user identification data, and environmental data;

generate a content payload using at least a portion of the received data elements, wherein the content payload comprises source code defining content for display, a style of the content for display, and a layout of the content for display, the generating step including querying a content repository using the received data elements to retrieve portions of the source code and aggregating the retrieved portions of the source code to form the content payload;

receive a request for the content payload from the network device; and transmit the content payload to the network device for generation of a graphical display using source code from the content payload.

15. The system of claim 14, wherein the tag comprises an NFC tag, a BLE beacon, a QR code tag, an RFID tag, a WiFi access point, a ZigBee module, or a URL.

16. The system of claim 14, wherein the interaction comprises a scan of the tag by circuitry of the network device.

17. The system of claim 14, wherein the server computing device is further configured to:

redirect the network device to a second server computing device upon generation of the content payload using a URL associated with the second server computing device; and receive the request for the content payload from the second server computing device.

18. The system of claim 17, wherein the server computing device is further configured to:

generate a security key associated with the content payload at the time that the content payload is generated; and transmit the security key to the second server computing device as part of the redirecting step.

19. The system of claim 18, wherein the second server computing device is further configured to retrieve the content payload using the security key.

20. The system of claim 14, wherein the network device uses web browser software to connect to the server computing device and to display the content payload.

21. The system of claim 14, wherein the network device uses a native application to connect to the server computing device and to display the content payload.

22. The system of claim 14, wherein the server computing device is further configured to retrieve source code from a third-party server computing device upon receiving the request for the content payload from the network device and add the source code from the third-party server computing device into the content payload.

23. The system of claim 14, wherein the network device location data comprises IP location data, GPS data or geolocation data.

24. The system of claim 14, wherein the network device identification data comprises operating system data, manufacturer data, device type data, carrier data, or device metadata.

25. The system of claim 14, wherein at least a portion of the plurality of data elements received from the network device is stored in a cookie on the network device.

26. The system of claim 14, wherein the content payload comprises a JSON file with one or more key-value pairs corresponding to the content for display, the style of the content for display, or the layout of the content for display.

27. A computer program product, tangibly embodied in a non-transitory computer readable storage device, for dynamically generating customized content for display on a network device, the computer program product including instructions that, when executed, cause a server computing device to:

receive a plurality of data elements from a network device upon initiation of an interaction between the network device and a tag in proximity to the network device, wherein the plurality of data elements comprise tag identification data, tag location data, tag metadata, network device identification data, network device location data, network device application data, network device sensor data, user identification data, and environmental data;

generate a content payload using at least a portion of the received data elements, wherein the content payload comprises source code defining content for display, a style of the content for display, and a layout of the content for display, the generating step including querying a content repository using the received data elements to retrieve portions of the source code and aggregating the retrieved portions of the source code to form the content payload;

receive a request for the content payload from the network device; and transmit the content payload to the network device for generation of a graphical display using source code from the content payload.

\* \* \* \* \*